United States Patent [19]

Iwai

[11] Patent Number: 5,330,090
[45] Date of Patent: Jul. 19, 1994

[54] BRAZING AGENT AND A BRAZING SHEET BOTH COMPRISING AN ALUMINUM ALLOY CONTAINING A FLUX

[75] Inventor: Ichiro Iwai, Oyamashi, Japan

[73] Assignee: Showa Aluminum Corporation, Osaka, Japan

[21] Appl. No.: 994,556

[22] Filed: Dec. 21, 1992

[30] Foreign Application Priority Data

Dec. 27, 1991 [JP] Japan .................................. 3-346994
Jan. 14, 1992 [JP] Japan .................................. 4-005031

[51] Int. Cl.$^5$ ............................................ B23K 25/363
[52] U.S. Cl. .................................... 228/56.3; 228/224; 148/24
[58] Field of Search ................... 228/56.3, 263.17, 224, 228/207, 246, 248, 183; 419/2; 148/24, 26

[56] References Cited

U.S. PATENT DOCUMENTS

| | | | |
|---|---|---|---|
| 3,667,111 | 6/1972 | Chartet | 228/224 |
| 4,901,909 | 2/1990 | George | 228/224 |
| 4,981,526 | 1/1991 | Kudo et al. | 228/224 |
| 5,100,048 | 3/1992 | Timsit | 228/198 |
| 5,173,126 | 12/1992 | Ogura et al. | 228/224 |

OTHER PUBLICATIONS

Metals Handbook Ninth Edition, vol. 6, "Brazing of Aluminum Alloys", pp. 1022–1032.

*Primary Examiner*—Samuel M. Heinrich
*Attorney, Agent, or Firm*—Tilton, Fallon, Lungmus & Chestnut

[57] ABSTRACT

A brazing agent comprises an aluminum alloy which contains a flux, the agent having an apparent density of 90% or more of a theoretical density, the aluminum alloy comprises in addition to the flux: aluminum element; and silicon element at about 3–15% by weight of all the elements other than the flux, so that the ratio in weight of all the elements to the flux is from 99.9:0.1 to 70:30. The aluminum alloy may further contain one or more elements selected from a group consisting of zinc, tin and indium, at about 0.1–5%, 0.01–0.5% and 0.01–0.5% by weight of all the elements, respectively. A brazing sheet may be of such a structure that a core sheet made of aluminum or its alloy has at least one surface clad with a skin layer which has a thickness of 10 μm or more for each surface.

24 Claims, 1 Drawing Sheet

BRAZING AGENT AND A BRAZING SHEET BOTH COMPRISING AN ALUMINUM ALLOY CONTAINING A FLUX

TECHNICAL FIELD

The present invention relates to a new type of a brazing agent which is composed of an aluminum alloy and a flux and is adapted for use to braze articles of aluminum or its alloy with the aid of the flux, and also relates to an aluminum brazing sheet which comprises a core sheet clad with such a brazing agent.

BACKGROUND ART

In the prior art "flux-brazing method" it is a common practice to braze articles of aluminum or its alloy one to another by applying a brazing agent together with a flux to the abutting portion of the articles which are to be heated, wherein the flux is usually suspended in an appropriate liquid. In order to facilitate the manufacture of aluminum products, an aluminum brazing sheet has been employed as one or both of the brazed articles. The aluminum brazing sheet comprises a core sheet having its either or both surfaces clad with a skin layer, and this layer is composed of a certain brazing agent. The flux suspension is applied also to the abutting portions even if such a brazing sheet is employed and heated in the "flux-brazing" method.

Thus, both the brazing agent and the flux must be applied separately or successively to the brazed portions, whether the aluminum brazing sheet is or is not used. This has rendered comparatively intricate the operation in the prior art method of manufacturing the aluminum products. It is another drawback that the applied amount of flux is likely to vary among batches or products. An insufficient amount of the flux will cause an imperfect brazing, while a superfluous amount brings about other problems such as the residual flux in the brazed portions and the drippings of flux within a brazing oven. The flux residue will impair the appearance and the surface processability of the products, while the flux drippings polluting the oven.

A proposal was made and has been employed to avoid those problems resulting from the separate or successive application of the flux and the brazing agent. According to this proposal, a paste or liquid which comprises a binder or vehicle such as an acrylic resin containing a flux powder and an Al-Si powder as the blazing agent will be coated on the brazed portions, whereby the operation is simplified to a significant degree.

The existence of the binder in the brazed portions will however impair the brazing quality.

The present invention was made to resolve the problems referred to above in the prior art methods for "flux-brazing" aluminum materials or aluminum alloy materials. Therefore, an object of the invention is to provide a brazing agent comprising an aluminum alloy which contains a flux (hereinafter referred to as "flux-containing aluminum alloy brazing agent"), and also to provide an aluminum brazing sheet made partially of the flux-containing aluminum alloy brazing agent. The brazing agent and the brazing sheet in the invention are designed such that the variation in the applied amount of flux is eliminated improving the brazeability, the appearance of the brazed articles as well as the surface process ability thereof, and such that the brazing process is remarkably simplified.

DISCLOSURE OF THE INVENTION

A series of the flux-containing aluminum alloy brazing agents, which are effective to achieve the object, basically comprises Al (i.e., aluminum), Si (i.e., silicon) and a flux. The alloy is composed of Al and Si which is contained in the elements other than the flux at a content of about 3–15% by weight of the elements, with the weight ratio of the elements to the flux being 99.9:0.1 to 70:30, and the apparent density of each brazing agent is 90% or more of a calculated theoretical value. The alloy in the brazing agents may contain one or more further elements selected from a group consisting of Zn (i.e., zinc), Sn (i.e., tin) and In (i.e., indium), wherein the Zn content, Sn content and In content are 0.1–5%, 0.01–0.5% and 0.01–0.5% by weight of the elements other than the flux, respectively.

From another aspect of the present invention, there are provided a series of flux-containing aluminum brazing sheets each comprising a core sheet, which is formed of aluminum or its alloy and has its either or both surfaces clad with a skin layer, wherein the skin layer is composed of any of the flux-containing aluminum alloy brazing agents and is of a thickness of 10 μm or more for each surface of the core sheet.

The elements Al and Si serve as the brazing agent herein for bonding the aluminum or aluminum alloy members one to another. A Si content below 3% or above 15% by weight in the elements other than the flux will render so high the the "liquidus line" temperature that the brazing of said members become difficult. Consequently, the Si content has to fall within a range of 3–15% by weight, and more desirably a narrower range of 6–12 % by weight.

The other elements Zn, Sn and In make negative the electrical potential of the brazing agent so that it can act as a sacrificial anode to improve the corrosion resistance of the brazed aluminum articles. From this point of view, the three elements are equivalent to each other, and thus it is sufficient for the alloy in the brazing agent to contain at least one of them. If the content of Zn, Sn or In in the total mass of the elements other than flux is less than 0.1%, 0.01% or 0.01% by weight, respectively, then the effect of sacrificial anode will be poor. However this effect will not increase above a peak even if their contents exceed 5%, 0.5% and 0.5% by weight, respectively. Thus, the Zn content, Sn content and In content must fall within the ranges of 0.1–5 %, 0.01–0.5 % and 0.01–0.5% by weight, and more desirably the ranges of 0.5–2.0%, 0.05–0.3% and 0.03–0.1% by weight of all the elements other than the flux.

The alloy in the brazing agent may further contain Cu (i.e., copper) which improves the strength of said agent, and Cu content is preferably 0.05–5% by weight of all the elements other than the flux.

It is possible herein to employ any of proper fluxes which may preferably be fluorides or chlorides. An example of the fluoride fluxes is a complex or mixture substantially having an eutectic composition comprising 45.8% of KF and 54.2% of $AlF_3$ or a like composition. The other fluoride fluxes include the complexes of $KAlF_4$, $K_2AlF_5$ and $K_3AlF_6$ or the like. The main ingredients of the chloride fluxes, which are preferably less hygroscopic in order to protect the brazed portions from corrosion, are for example $BaCl_2$, KCl and/or ZnCl$_2$. A typical chloride flux is a ternary eutectic mixture of BaCl$_2$-KCl-ZnCl$_2$.

The ratio in weight of the total mass of elements, i.e., Al, Si and one or more elements selected from the group consisting of Zn, Sn and In, to the flux is preferably from 99.9:0.1 to 70:30. In a case wherein the flux is contained at a weight ratio smaller than 99.9:0.1, the brazing process becomes unsmooth and difficult due to a poor fluxing effect. If an excessive amount of the flux is contained at a weight ratio greater than 70:30, then a mixture of the flux with the elements such as Al and Si can scarcely be solid, thereby rendering it difficult to produce the flux-containing brazing agent. Thus a preferable ratio in weight of the flux is 99.9:0.1 to 85:15, and more desirably 98:2–90:10.

The flux-containing aluminum alloy brazing agent in the invention will generally be produced by mixing an aluminum powder, silicon powder, one or more powders selected from the group of zinc, tin and indium powders, and a flux powder together with one another, and thereafter compacting the mixture to form a rigid integral piece by means of a hot press or the like. This rigid piece of the brazing agent is more or less porous due to a considerable amount of air remaining within the piece. Although its apparent density is thus smaller than a theoretical density calculated using the densities of Al, Si, Zn, Sn, In and flux, the brazing agent of the present invention must have a density which is 90% or more of the theoretical density. With the apparent density lower than 90%, the rigid integral piece will probably have an intercommunicating porosity, wherein outer pores communicate with inner pores of the piece so that it is rendered brittle and fragile. Such a rigid but excessively porous agent cannot easily be processed in the subsequent treatments, apart from its poor effect in the brazing process. Therefore, the apparent density of the brazing agent is more preferably 95% or more of the theoretical value.

The method of producing the flux-containing aluminum alloy brazing agent in accordance with the invention will now be given in more detail. Raw materials which are to be prepared at first are an aluminum powder, silicon powder, one or more of zinc, tin and indium powders and a flux powder. In order to ensure the homogeneous mixing of the powders, they must be pulverized so that the average diameters of fine particles must be 44 μm or less and 5 μm or less, respectively for the aluminum and silicon powders. Also, the average diameter of fine particles of zinc, tin and indium powders must be 44 μm or less, with that of the flux powder being controlled to be 30 μm or less. Al, Si, Zn, Sn and In need not necessarily be used in their element form, but instead an Al-Si alloy which may contain Zn, Sn and/or In can be employed as the raw material. These powders will be blended with one another in the ratio described above to give a mixture, which is then poured into a vessel such as an aluminum can. After this can thus filled with the powder mixture is degassed by reducing its internal pressure to 1 mmHg or less, said mixture will be heated and compacted by means of a hot press or the like so as to give an integral and rigid piece. Then, the can will be cut to expose the compacted piece for the subsequent processes such as the extrusion process, whereby the flux-containing aluminum alloy brazing agent is obtained in any desired form.

On the other hand, the flux-containing aluminum brazing sheet in accordance with the invention is of such a structure as exemplified in FIG. 1. This brazing sheet comprises a core sheet 1 having its either or both surfaces clad with a skin layer 2, which layer is composed of the flux-containing aluminum alloy brazing agent as detailed above. With the skin layer thinner than 10 μm for each surface, the brazing process can hardly be done smooth and perfect, due to the shortage of the brazing agent. Thus, thickness of the skin layer 2 must be 10 μm or more for each surface of the core sheet, and more desirably 20 μm or more for said surfaces.

To manufacture the flux-containing aluminum brazing sheet, the flux-containing aluminum alloy brazing agent as previously produced in the manner described above may be processed to form a sheet as the skin layer 2. This sheet as the skin layer 2 may subsequently be heated and pressure welded to the core sheet 1 to thereby provide a raw brazing sheet, which may further be hot rolled and cold rolled, if necessary. The core sheet need not be of any specified chemical composition, but here can be employed any conventional alloy such as the so-called 3000-series aluminum alloys including JIS-A3003 and JIS-A3005, or the so-called 6000-series alloys including JIS-A6951.

In use, the flux contained in the brazing agent will be supplied therefrom to the portions which are being brazed as the brazing agent melts. The flux supplied in this way will remove the surface oxide membrane from said portions of the flux-containing aluminum brazing sheet of the present invention. Thus, the brazing agent will spread over and thoroughly wet the portions which are to be welded perfect one to another. It will now be understood that here is no necessity for additionally or independently applying the flux to said portions which are to be brazed, whereby the process becomes simpler and the productivity of the brazed aluminum articles is improved. It is another advantage of the invention that a proper quantity of the flux can be given in a constant manner to any brazed portions. Application of the flux in surplus can now be avoided not to impair the appearance and surface processability of the brazed products or to spoil the interior of the brazing oven.

In a case wherein the brazing agent contains Zn, Sn and/or In which enhance the sacrificial anode effect, the brazed products may especially be improved in their corrosion resistance, if required.

THE PREFERRED EMBODIMENTS

Figure 1:
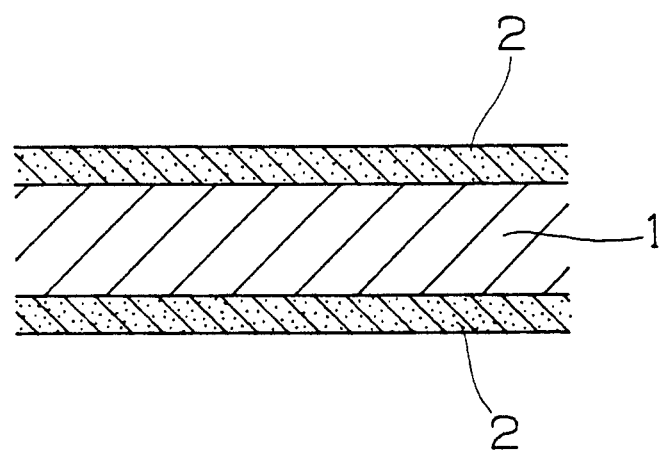
FIG. 1 is a cross section showing a flux-containing aluminum brazing sheet in an embodiment of the present invention.

The embodiment of the invention will now be described in detail referring to the drawings.

As a main raw material used to produce a flux-containing aluminum alloy brazing agent and a brazing sheet comprising same, an aluminum powder of 99.5% purity and having an average particle diameter (abbr. "av. dia.") of 44 μm was prepared, together with other raw materials which were: a silicon powder having av. dia. of 5 μm; a zinc powder having av. dia. of 44 μm; a tin powder having av. dia. of 40 μm; an indium powder having av. dia. of 40 μm; and a fluoride flux powder having av. dia. of 30 μm. This flux was an eutectic composition of KF and AlF$_3$.

First Embodiment

The powders were blended at room temperature with one another to be homogeneous at the ratios given for the samples 1 to 17 on Table 1. Aluminum cans each 200 mm long and having a diameter of 3 inches were filled with those powders at the atmospheric pressure. The aluminum cans were then placed in an oven and vacuumed at 500° C. to be degassed below 1 mmHg. Subsequently, each aluminum can was heated to 480° C. and subjected to the hot pressing process using a hot press whose maximum pressure was 400 tons so as to form a compacted block. The length of these blocks was 110 mm.

The aluminum cylinder enclosing each block was removed by the machining technique. Each block was then hot-extruded at 500° C. from an extruder to provide a flux-containing aluminum alloy brazing agent in the form of a flat plate of 2 mm thick and 50 mm wide. The behavior of those blocks when extruded is listed on Table 1, to indicate their feasibility of extrusion.

Density of those brazing agents which were smoothly extruded was measured and compared with their theoretical values calculated using the density of the raw materials. The ratio of each measured density to the theoretical density is shown on Table 1.

The flux-containing brazing agents, to which allotted are the Nos. 1, 2, 4–7, 9, 11–14, 16 and 17, were feasible to extrude. Test pieces each 10 mm long, 10 mm wide and 2 mm thick were cut from the flat plates. Each test piece was placed on an aluminum alloy support plate which was formed of JIS-A3003 alloy to be 100 mm long, 50 mm wide and 2 mm thick. Subsequently, each of the test pieces set on the support plate was heated at 600°–620° C. for 10 minutes in nitrogen gas and also in atmosphere.

This test was for the evaluation of brazeability based on their "speadability" over the support plate. Results of this test are also given on Table 2.

TABLE 1

| Braz. agents | Content of elements in the mass other than flux: (wt %) | | | | Blend ratio of elements to flux: (wt) | Extrudability (*1) | Density in % of theor. value |
|---|---|---|---|---|---|---|---|
| | Si | Zn | Sn | In | Al | | |
| Ref. 1 | 1(#) | — | — | — | bal. | 90:10 | fair | 98 or more |
| Inv. 2 | 5 | — | — | — | bal. | 90:10 | fair | 98 or more |
| Ref. 3 | 5 | — | — | — | bal. | 68:32(#) | poor | — |
| Inv. 4 | 10 | — | — | — | bal. | 95:5 | fair | 98 or more |
| Ref. 5 | 10 | — | — | — | bal. | 100:0(#) | fair | 98 or more |
| Inv. 6 | 10 | — | — | — | bal. | 90:10 | fair | 98 or more |
| Ref. 7 | 10 | — | — | — | bal. | 68:32(#) | fair | 98 or more |
| Ref. 8 | 20(#) | — | — | — | bal. | 90:10 | poor | — |
| Inv. 9 | 5 | 2.0 | — | — | bal. | 90:10 | fair | 98 or more |
| Ref. 10 | 5 | 2.0 | — | — | bal. | 68:32(#) | poor | — |
| Inv. 11 | 10 | — | 0.2 | — | bal. | 95:5 | fair | 98 or more |
| Inv. 12 | 10 | — | — | 0.2 | bal. | 92:8 | fair | 98 or more |
| Ref. 13 | 10 | — | 0.2 | 0.2 | bal. | 100:0(#) | fair | 98 or more |
| Inv. 14 | 10 | 1.0 | 0.1 | 0.1 | bal. | 90:10 | fair | 98 or more |
| Ref. 15 | 10 | 2.0 | 0.1 | — | bal. | 68:32(#) | poor | — |
| Ref. 16 | 20(#) | — | — | 0.2 | bal. | 90:10 | fair | 98 or more |
| Ref. 17 | 10 | —(#) | —(#) | —(#) | bal. | 90:10 | fair | 98 or more |

Values marked with (#) are deviation from the invention.
Notes:
(*1): "Fair" means a good extrudability, with "poor" meaning an inferior extrudability causing cracks in the extrusions. Ref. = Reference, Inv. = Invention, Braz. = Brazing, theor. = theoretical, bal. = balance

TABLE 2

| Braz. agents | Brazeability (*1) | | Corrosion resistance (*2) |
|---|---|---|---|
| | in atmosphere | in nitrogen gas | |
| Ref. 1 | X | X | (—) |
| Inv. 2 | ◯ | ◯ | Δ |
| Inv. 4 | ◯ | ◯ | Δ |
| Ref. 5 | X | X | (—) |
| Inv. 6 | ◯ | ◯ | Δ |
| Ref. 7 | Δ | Δ | (—) |
| Inv. 9 | ◯ | ◯ | ◯ |
| Inv. 11 | ◯ | ◯ | ◯ |
| Inv. 12 | ◯ | ◯ | ◯ |
| Ref. 13 | X | X | (—) |
| Inv. 14 | ◯ | ◯ | ◯ |
| Ref. 16 | Δ | Δ | (—) |
| Ref. 17 | ◯ | ◯ | Δ |

Notes:
(*1): The symbol "◯" indicates that the support plate was sufficiently wetted with the brazing agent which spread wide. The further symbol "Δ" indicates that the support plate was merely partially wetted with the brazing agent. The still further symbol "X" indicates that the support plate was scarcely wetted with the brazing agent.
(*2): The symbol "◯" indicates no corrosion was observed. The further symbol "Δ" indicates that corrosion was observed more or less.

The salt solution spraying test was carried out for 1000 hours according to JIS-Z2371 method for the brazing agents Nos. 2, 4, 6, 9, 11, 12, 14 and 17. After that, corrosion was checked to evaluate the corrosion resistance of the A3003 alloy support plate's area covered with the brazing agent. Results of this test is shown in Table 2, wherein a single rating was allotted to each sample because no difference was observed between those which were spread within $N_2$ gas and atmosphere in the breazeability test.

Second Embodiment

Each of the brazing agents Nos. 1, 2, 4–7, 9, 11–14, 16 and 17 which had proved extrudable were hot pressure-welded to both sides of an extruded core sheet of JIS-A3003 aluminum alloy. The thus welded composite sheet, which was 20 mm thick, 50 mm wide and 200 mm long, was cold rolled into a reduced thickness of 1 mm (its skin layer on one side being about 83 μm ), or a lesser thickness of 0.1 mm (its skin layer on one side being about 8.3 μm) so that a flux-containing aluminum brazing sheets were provided.

Subsequent to this cold rolling process, a rectangular test piece being 50 mm long and 30 mm wide was severed from each brazing sheet. A reversed T-joint was prepared by erecting each test piece on a support plate which was made of JIS-A3003 aluminum alloy and 50 mm long, 30 mm wide and 1 mm thick. The reversed T-joints were then heated to 600°–620° C. for 10 minutes in atmosphere or in $N_2$ gas so that the brazing sheets were brazed to the support plates, respectively. Their brazeability was evaluated and gave a result shown in Table 3.

TABLE 3

| Braz. agents | Brazeability (*1) | | | | Corrosion resistance (*2) (#1 mm) |
|---|---|---|---|---|---|
| | in atmosphere | | in nitrogen gas | | |
| | #1 mm | #0.1 mm | #1 mm | #0.1 mm | |
| Ref. 1 | X | X | X | X | — |
| Inv. 2 | O | X | O | X | X |
| Inv. 4 | O | X | O | X | X |
| Ref. 5 | X | X | X | X | — |
| Inv. 6 | O | Δ | O | Δ | X |
| Ref. 7 | Δ | X | Δ | X | — |
| Inv. 9 | O | X | O | X | O |
| Inv. 11 | O | X | O | X | O |
| Inv. 12 | O | X | O | X | O |
| Ref. 13 | X | X | X | X | — |
| Inv. 14 | O | Δ | O | Δ | O |
| Ref. 16 | Δ | X | Δ | X | — |
| Ref. 17 | O | X | O | X | X |

Notes:
(#) represents the thickness of the brazing sheets.
(*1): The symbol "O" indicates that the support plate was sufficiently wetted with the brazing agent which spread wide to ensure a satisfactory brazing. The further symbol "Δ" indicates that the support plate was merely partially wetted with the brazing agent, causing the brazing insufficient. The still further symbol "X" indicates that the support plate was scarcely wetted with the brazing agent, thereby rendering extremely poor the brazing.
(*2): The symbol "O" indicates no corrosion was observed. The further symbol "X" indicates that a violent corrosion was observed.

The salt solution spraying test was also carried out for 1000 hours according to JIS-Z237 method for the samples (whose sheet thickness was 1 mm) comprising the brazing agents Nos. 2, 4, 6, 9, 11, 12, 14 and 17. After that, corrosion of the core sheets was checked to evaluate their corrosion resistance. Results of this test is shown in Table 3, wherein a single rating was allotted to each sample because no difference was observed between those which were spread within $N_2$ gas or atmosphere in the breazeability test.

As will be seen from Table 2, the flux-containing aluminum alloy brazing agent of the present invention is if a high brazeability not only in the $N_2$ gas but also in atmosphere even without use of any additional amount of flux. In a case wherein the brazing agent contains Zn, Sn and/or In, the corrosion resistance of the brazed articles is improved to a remarkable extent. As also seen from Table 3, the flux-containing aluminum brazing sheet having its core sheet covered with the skin layer composed of such a brazing agent did prove excellent both in its brazeability and corrosion resistance, similarly to the brazing agent itself.

Moreover, the aluminum alloy brazing agent of the invention is excellent also in its processability in the extruding, the pressure welding or other treatments, provided that its silicon content and flux content are within the range defined herein. The brazing agent used for the production of above-described flat sheet is also adapted for making any other sheets of a complicated shape if the pressing, the molding or other adequate techniques are employed solely or in combination. Thus, the brazing of various aluminum members can be done easily, with a further possibility of changing the shape of the brazing sheet prior to the brazing thereof.

USAGE IN INDUSTRIES

Since the brazing agent and brazing sheet provided in the invention do not need any amount of flux added separately or independently when the brazing is done, the operation for brazing aluminum members is now much simpler than in the prior art flux-brazing method. The brazing process may be remarkably simplified, and the period of time necessary for aluminum members to be brazed will be shortened to a surprising degree, particularly in a case wherein those members must be brazed one to another at many portions thereof, for example in a case of manufacturing heat exchangers from aluminum materials.

What is claimed is:

1. A flux-containing aluminum alloy brazing agent consisting essentially of a compacted powder mixture of an aluminum element, a silicon element and the flux,
    wherein silicon is contained at 3–15% by weight of all the elements other than the flux, and the ratio in weight of all the elements other than the flux to the flux is from 99.9:0.1 to 70:30, and wherein the apparent density is 90% or more of a theoretical density.

2. A brazing agent as defined in claim 1, wherein silicon element is contained at 6–12% by weight of all the elements other than the flux.

3. A brazing agent as defined in claim 1, wherein the ratio in weight of all the elements other than the flux to the flux is from 99.9:0.1 to 85:15.

4. A brazing agent as defined in claim 1, wherein the ratio in weight of all the elements other than the flux to the flux is from 98:2 to 90:10.

5. A flux-containing aluminum alloy brazing agent consisting essentially of a compacted powder mixture of an aluminum element, a silicon element, the flux and one or more elements selected from a group consisting of zinc, tin and indium,
    wherein said silicon element, said zinc element, said tin element and said indium element are contained at 3–15%, 0.1–5%, 0.01–0.5%, 0.01–0.5% by weight of all the elements other than the flux, respectively; and
    the ratio in weight of all the elements other than the flux to the flux is from 99.9:0.1 to 70:30, and wherein the apparent density is 90% or more of a theoretical density.

6. A brazing agent as defined in claim , wherein silicon element is contained at 6–12% by weight of all the elements other than the flux.

7. A brazing agent as defined in claim 5, wherein the ratio in weight of all the elements other than the flux to the flux is from 99.9:0.1 to 85:15.

8. A brazing agent as defined in claim 5, wherein the ratio in weight of all the elements to the flux is from 98:2 to 90:10.

9. A brazing agent as defined in claim 5, wherein zinc element, tin element and indium element are contained at 0.5–2, 0.05–0.3% and 0.03–0.1 respectively by weight of all the elements other than the flux.

10. A brazing sheet comprising:
    a core sheet made of aluminum or its alloy;
    a skin layer a flux clad to at least one of front and back surfaces of the core sheet, and having a thickness of 10 μm or more for each surface, the skin layer having an apparent density and being a compacted powder mixture, said compacted powder mixture consisting essentially of an aluminum element, a silicon element and a flux so that the silicon element is contained in the skin layer at 3-15% by weight of all the elements other than the flux, wherein the ratio in weight of all the elements other than the flux to the flux is from 99.9:0.1 to 70:30, and wherein the apparent density is 90% or more of a theoretical density.

11. A brazing sheet as defined in claim 10, wherein silicon element is contained in the skin layer at 6-12% by weight of all the elements other than the flux.

12. A brazing sheet as defined in claim 10, wherein the ratio in weight of all the elements other than the flux in the skin layer to the flux is from 99.9:0.1 to 85:15.

13. A brazing sheet as defined in claim 10, wherein the ratio in weight of all the elements other than the flux in the skin layer to the flux is from 98:2 to 90:10.

14. A brazing sheet as defined in claim 10, wherein the thickness of the skin layer is 20 $\mu$m or more.

15. A brazing sheet comprising:
a core sheet made of aluminum or its alloy;
a skin layer clad to at least one of front and back surfaces of the core sheet, and having a thickness of 10 $\mu$m or more for each surface, the skin layer having an apparent density and being a compacted powder mixture,
and said compacted powder mixture consisting essentially of an aluminum element, a silicon element, the flux and one or more elements selected from a group consisting of zinc, tin and indium, so that the silicon element, zinc element, tin element and indium element are contained at about 3-15%, 0.1-5%, 0.01-0.5%, 0.01-0.5% by weight of all the elements other than the flux, respectively; wherein the ratio in weight of all the elements other than the flux to the flux is from 99.9:0.1 to 70:30, and wherein the apparent density is 90% or more of a theoretical density.

16. A brazing sheet as defined in claim 15, wherein silicon element is contained in the skin layer at 6-12% by weight of all the elements other than the flux.

17. A brazing sheet as defined in claim 15, wherein the ratio in weight of all the elements other than the flux in the skin layer to the flux is from 99.9:0.1 to 85:15.

18. A brazing sheet as defined in claim 15, wherein the ratio in weight of all the elements other than the flux in the skin layer to the flux is from 98:2 to 90:10.

19. A brazing sheet as defined in claim 15, wherein zinc element, tin element and indium element are contained at 0.5-2%, 0.05-0.3% and 0.03-0.1% respectively by weight of all the elements other than the flux.

20. A brazing sheet as defined in claim 15, wherein the thickness of the skin layer is 20 $\mu$m or more.

21. A flux-containing aluminum alloy brazing agent consisting essentially of a compacted powder mixture of an aluminum element, a silicon element, a copper element and the flux wherein silicon is contained at 3-15% by weight of all the elements other than the flux, the copper is contained at 0.05-5% by weight of all the elements other than the flux, and the ratio in weight of all the elements other than the flux to the flux is from 99.9:0.1 to 70:30, and wherein the apparent density is 90% or more of a theoretical density.

22. A flux-containing aluminum alloy brazing agent consisting essentially of a compacted powder mixture of an aluminum element, a silicon element, a copper element, the flux and one or more elements selected from a group consisting of zinc, tin and indium, wherein said silicon element, said copper element, said zinc element, said tin element and said indium element are contained at 3-15%, 0.05-5%, 0.1-5%, 0.01-0.5%, 0.01-0.5% by weight of all the elements other than the flux, respectively; and the ratio in weight of all the elements other than the flux to the flux is from 99.9:0.1 to 70:30, and wherein the apparent density is 90% or more of a theoretical density.

23. A brazing sheet comprising:
a core sheet made of aluminum or its alloy; a skin layer a flux clad to at least one of front and back surfaces of the core sheet, and having a thickness of 10 $\mu$m or more for each surface, the skin layer having an apparent density and being a compacted powder mixture, said compacted powder mixture consisting essentially of an aluminum element, a silicon element, a copper element and a flux so that the silicon element is contained in the skin layer at 3-15% by weight of all the elements other than the flux, the copper element is contained in the skin layer at 0.05-5% by weight of all the elements other than the flux, and the ratio in weight of all the elements other than the flux to the flux is from 99.9:0.1 to 70:30, and wherein the apparent density is 90% or more of a theoretical density.

24. A brazing sheet comprising:
core sheet made of aluminum or its alloy;
a skin layer clad to at least one of front and back surfaces of the core sheet, and having a thickness of 10 $\mu$m or more for each surface, the skin layer having an apparent density and being a compacted powder mixture, and said compacted powder mixture consisting essentially of an aluminum element, a silicon element, a copper element, a flux and one or more elements selected from a group consisting of zinc, tin and indium, so that the silicon element, copper element, zinc element, tin element and indium element are contained at about 3-15%, 0.05-5%, 0.1-5%, 0.01-05%, 0.01-0.5% by weight of all the elements other than the flux, respectively; wherein the ratio in weight of all the elements other than the flux to the flux is from 99.9:0.1 to 70:30, and wherein the apparent density is 90% or more of a theoretical density.

* * * * *